United States Patent [19]
Cooper

[11] Patent Number: 4,789,894
[45] Date of Patent: Dec. 6, 1988

[54] MOTION ANALYZER WITH INTERLEAVED IMAGE REPRODUCTION

[75] Inventor: Todd H. Cooper, San Diego, Calif.

[73] Assignee: Eastman Kodak Company, Rochester, N.Y.

[21] Appl. No.: 26,078

[22] Filed: Mar. 16, 1987

[51] Int. Cl.$^4$ .................. H04N 7/18; H04N 7/01; H04N 7/12
[52] U.S. Cl. .................... 358/105; 358/140; 358/134; 358/312; 358/335; 360/10.1
[58] Field of Search ............... 358/105, 134, 312, 335, 358/140; 360/9.1, 10.1

[56] References Cited

U.S. PATENT DOCUMENTS

| | | | |
|---|---|---|---|
| 2,943,141 | 6/1960 | Knight | 358/108 |
| 3,924,267 | 12/1975 | Holt | 360/9.1 |
| 4,280,151 | 7/1981 | Tsunekawa et al. | 360/9.1 |
| 4,322,638 | 3/1982 | Lee et al. | 307/311 |
| 4,322,752 | 3/1982 | Bixby | 358/213.27 |
| 4,330,796 | 5/1982 | Anagnostopoulos et al. | 358/213.29 |
| 4,395,236 | 7/1983 | Gotthold | 358/335 |
| 4,496,995 | 1/1985 | Colles et al. | 360/9.1 |
| 4,511,886 | 4/1985 | Rodriquez | 358/105 |
| 4,575,771 | 3/1986 | Oota et al. | 360/10.1 |

Primary Examiner—James J. Groody
Assistant Examiner—John K. Peng
Attorney, Agent, or Firm—William F. Noval

[57] ABSTRACT

A motion analyzer in which full frames of video information from two video imagers are recorded in interleaved fashion on magnetic tape. The motion analyzer records at multiple frame rates in a block sequential format in which blocks of parallel lines of video information are recorded sequentially on magnetic tape. Frames of video in block format from one imager are alternately recorded on magnetic tape with frames of video in block format from the other imager. Although the effective recorded frame rate for each imager is one-half of the analyzer frame rate, each recorded frame has been exposed at the analyzer frame speed.

3 Claims, 8 Drawing Sheets

| IMAGER COLUMN | IMAGER LINE | BLOCK | BLOCK LINE | DISPLAY "A" OR "B" |
|---|---|---|---|---|
| 1-240 | 1-16 | 1 | 1-16 | B |
| 1-240 | 17-32 | 2 | 1-16 | B |
| 1-240 | 33-48 | 3 | 1-16 | B |
| 1-240 | 49-64 | 4 | 1-16 | B |
| 1-240 | 65-79 | 5 | 1-15 | B |
| 1-119 | 80 | 5 | 16 | B |
| 120-160 | 80 | 5 | 16 | A |
| 161-240 | 80 | 5 | 16 | B |
| 1-119 | 81-96 | 6 | 1-16 | B |
| 120-160 | 81-96 | 6 | 1-16 | A |
| 161-240 | 81-96 | 6 | 1-16 | B |
| 1-119 | 97-110 | 7 | 1-14 | B |
| 120-160 | 97-110 | 7 | 1-14 | A |
| 161-240 | 97-110 | 7 | 1-14 | B |
| 1-240 | 111-112 | 7 | 15-16 | B |
| 1-240 | 113-128 | 8 | 1-16 | B |
| 1-240 | 129-144 | 9 | 1-16 | B |
| 1-240 | 145-160 | 10 | 1-16 | B |
| 1-240 | 161-176 | 11 | 1-16 | B |
| 1-240 | 177-192 | 12 | 1-16 | B |

MOTION ANALYZER WITH INTERLEAVED IMAGE REPRODUCTION

BACKGROUND OF THE INVENTION

In general, this invention relates to motion analysis systems and more particularly, this invention relates to motion analysis systems in which images from two video imagers are recorded and reproduced in interleaved format.

Motion analysis of fast moving phenomena in slow motion entails the recording of a great number of images during an event at high speed, and then playing the images back slowly to analyze the movement which has occurred in step-by-step progression. Applications for motion analysis include malfunctions in high speed machinery, movements of an athlete, failure of safety equipment, shattering of an object and physical reactions to a tire hitting a pothole at high speed. One type of motion analyzer is the SP 2000 Motion Analysis System available from the Spin Physics Division of the Eastman Kodak Co. This system includes a video camera, a variable speed magnetic tape processor and a cathode ray tube (CRT) display monitor. The camera is capable of producing signals corresponding to selected frame rates of from 60 to about 2000 frames per second. The video is read out from the imager in block format, i.e., a plurality of lines of video simultaneously and is recorded in sequential blocks on a plurality of longitudinal tracks on tape. The magnetic tape processing system is capable of recording at one tape speed and appropriately slowing down the tape during playback to a certain predetermined speed to down convert the camera signals regardless of the camera frame rate, to a nominal frame rate of 30 or 60 frames per second. The CRT display monitor receives the second frame rate playback signal from the magnetic tape processing system and displays the scene in question at an appropriate slow motion, depending upon the selected camera frame rate.

The SP 2000 Motion Analysis System can record (1) all of the frames from one imager; (2) all of the frames from the other imager and (3) a frame which is a composite of part of a frame from one imager overlayed with a frame from the other imager. Although this system eminently satisfies the applications for which it is designed, there are certain applications where the need arises to record full frames from each imager simultaneously. The overlay technique does not satisfy this need since image areas from both frames are deleted in the recorded composite frame and it is sometimes desirable to have the deleted areas available for viewing. Using two motion analysis systems to effect recording of full frames from both imagers is costly and complex.

SUMMARY OF THE INVENTION

The present invention solves these problems by providing a motion analyzer having two video imagers which are read out in block format such that frames from each imager are recorded alternately on magnetic tape in block sequential format. Thus, full frames from each imager are interleaved on magnetic tape and are selectively reproduceable on a video monitor for analysis of the recorded event. Moreover, the frames from each imager are recorded at the selected frame rate exposure speed thus preserving the motion stopping ability selected for an event. According to an aspect of the invention, the recorded frames from one or the other of the imagers may be played back or the images may be played back in an interleaved manner.

DESCRIPTION OF THE DRAWINGS

In a detailed description of the preferred embodiments of the invention presented below, reference is made to the accompanying drawings in which like numerals refer to like elements.

DESCRIPTION OF THE PREFERRED EMBODIMENT

The application in which the embodiments of the present invention will be described relates to a motion analyzer which records scene information at a high frame rate and plays back such information at a slower frame rate, thereby allowing slow motion analysis of a moving object. The imager frame rate used for recording is variable between 30 and 1,000 frames per second, depending upon the desired speed reduction while the display frame rate is constant at 30 frames per second. Accordingly, the apparent speed at which an object moves when viewed upon playback will be reduced by a factor equal to the ratio of the recording frame rate to the playback frame rate. The maximum speed reduction is therefore about 33 (i.e. 1,000 divided by 30). At this speed reduction, the exposure time for each frame is 1/1000 of a second which is short enough to provide high resolution images, with very little image smear of rapidly moving objects.

To accomplish such frame rate conversion, the variable speed magnetic tape processor records and reproduces an imager signal with a recording tape speed to reproduction tape speed ratio that equals the ratio of the imager frame rate to the display frame rate. The magnetic tape processor operates in cooperation with a divide-by-N circuit that selectively alters the frequency content of the video signal to be recorded, and in a manner to be described in detail below, both the value of (N) and the ratio of the recording to playback tape speed are controlled by the selected speed reduction.

Figure 1:
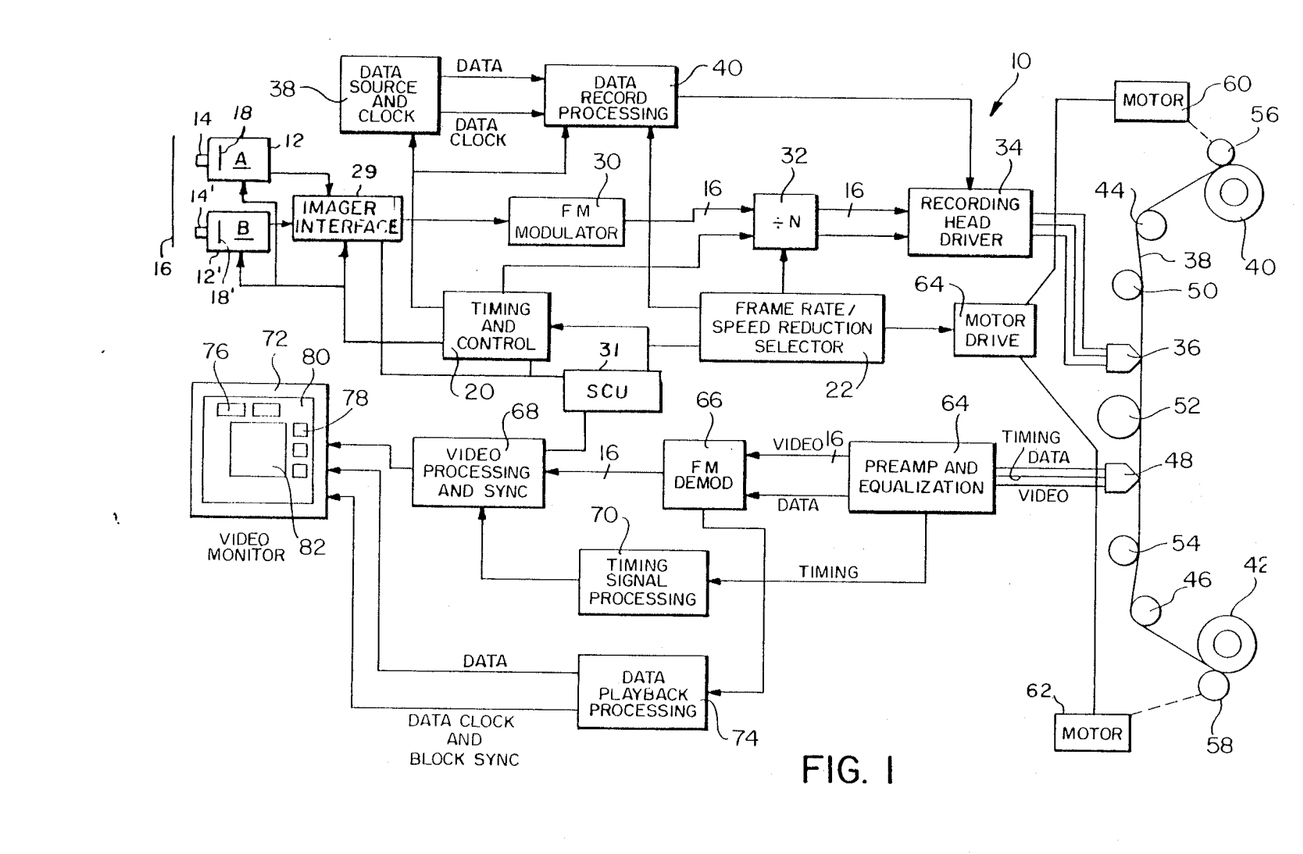
FIG. 1 is functional block diagram of a motion analyzer including an embodiment of the present invention.
Figure 5:
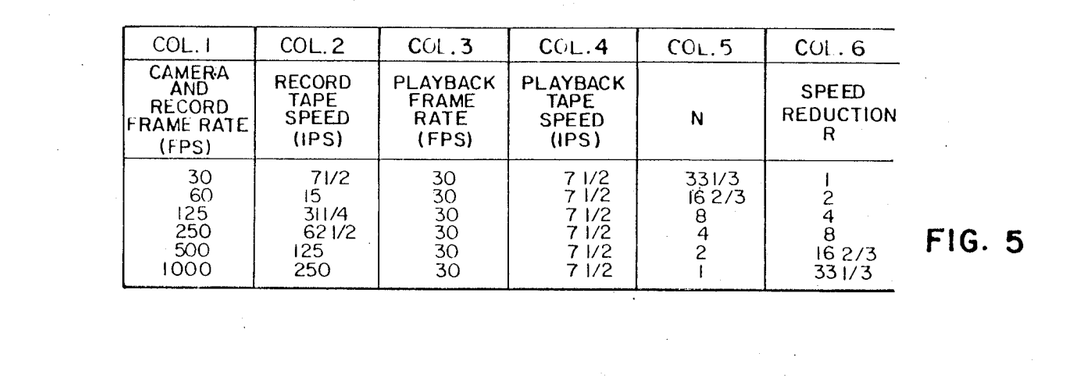
FIG. 5 shows the relationship between various operational parameters of the motion analyzer shown in FIG. 1.

Referring to FIG. 1, there is shown a functional block, schematic diagram showing a motion analyzer including an embodiment of the present invention. The motion analyzer 10 includes "A" and "B" imagers 12 and 12' having lenses 14 and 14' which image a scene 16 onto sensors 18 and 18'. Imagers 12 and 12' are controlled by timing circuit 20 which supplies suitable timing signals to imagers 12 and 12' as a function of the operator selectable frame rate and speed reduction entered into by selector 22. The timing signals produced by circuit 20 are in accordance with the parameters tabulated in Columns 1 and 5 of FIG. 5. Thus, if a speed reduction of 8 (Col. 5) is selected, the imager will image scene 16 at a frame rate of 250 frames per second (Col. 1).

Sensors 18 and 18' are "block" readable area image sensors. The basic concept of a block readout of a solid state area image sensor is disclosed in U.S. Pat. No. 4,322,752 in the name of James A. Bixby which is incorporated herein by reference. Specific types of block readable sensors are disclosed in U.S. Pat. No. 4,322,638, issued Mar. 30, 1982 in the names of T. H. Lee and R. P. Khosla; and U.S. Pat. No. 4,330,796 in the name of C. N. Anagnostopoulos et al, both of which are herein incorporated by reference.

Figure 2:
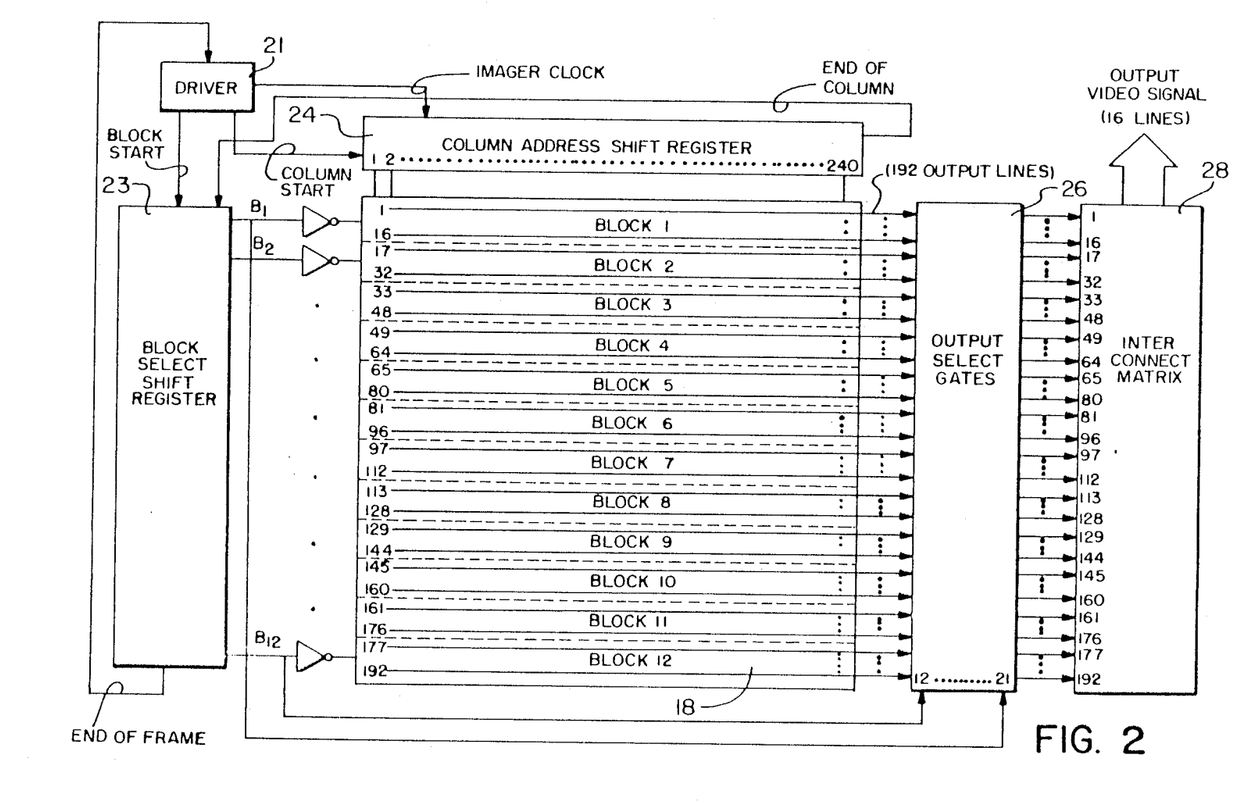
FIG. 2 is a functional block schematic diagram of a block readable area imager.
Figure 3A:
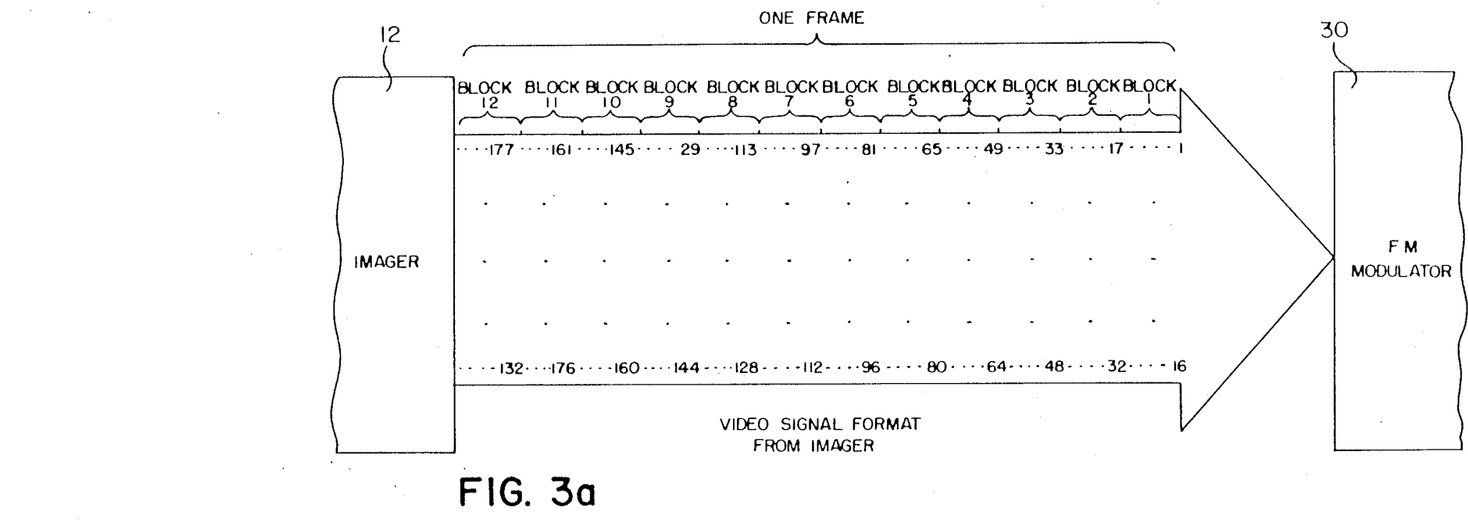
FIGS. 3a and 3b depict the format and content of a video signal produced by block readout of an area image sensor.
Figure 3B:
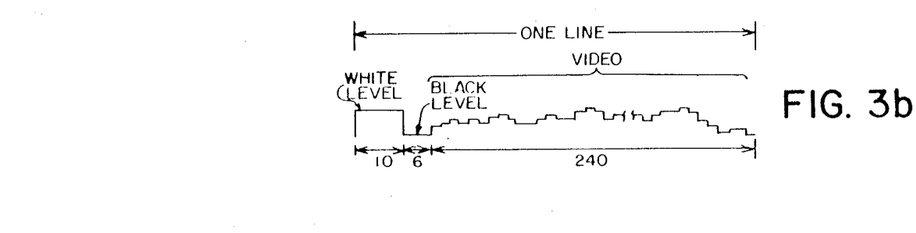

Although the referenced patents provide detailed information, the basic concept of block readout is illustrated in FIGS. 2 and 3. FIG. 2 shows a block readable sensor 18 (or 18') that includes an array of photosites (not shown individually) arranged in 192 rows and 240 columns. For purposes of readout, sensor 18 (18') is formatted into 12 blocks of 16 photosite rows each. Although demarcation between blocks is indicated by dashed lines, it will be understood that no physical demarcation on the sensor itself is necessary. Each photosite is readable upon the application thereto of an enablement signal and an address signal. To begin readout, a driver 21 produces a BLOCK START signal that causes a block select shift register 23 to produce an enablement signal that enables (via block enable line $B_1$) all photosite rows within block 1, i.e. rows 1–16. In response to a COLUMN START signal from the driver 21 column address electronics in the form of a shift register 24 sequentially addresses the 240 photosite columns of the entire area image sensor 18. Because the photosite rows within blocks 2–6 (rows 17–192) are not enabled, only photosite rows 1–16 (block 1) are read out at this time. The remaining photosites in the not-enabled blocks continue to integrate charge in response to incident radiation from scene 16. After all columns have been addressed an END OF COLUMN signal sequences the block select shift register 23 to enable via block enable line $B_2$, the block 2 photosite rows, i.e., rows 17–32. Column-wise readout then proceeds as described above for the block 1 photosite rows. This process is repeated until all 12 blocks of photosite rows are read out at which time END OF FRAME signal from block select shift register 23 resets driver 21 for readout of the next frame.

Output select gates 26 and an interconnect matrix 28 of conductive bus lines perform the function of a block multiplexer that causes only signals from the 16 photosite rows within the block that is being read out to appear as an output signal. Reference is made to U.S. Pat. No. 4,322,752 referenced above for a more detailed discussion of the construction of output select gates 26 and matrix 28.

As a result of such read out, block information is produced in series and each block of information contains 16 row signals arranged in parallel. A result of such a readout technique is a reduction of the time required for sensor readouts by a factor of 16 (i.e. the number of photosite rows in a block).

As shown in FIG. 3a, the video signal resulting from block readout of a single frame is comprised of a serial train of block information wherein each block is comprised of 16 lines of video information that correspond to the 16 rows of photosites within each block. Each individual line of video information (see FIG. 3a) is an analog signal varying in level proportionate to the level of scene illuminance, and each line contains 240 picture elements (pixels) that correspond respectively to the 240 photosites in each row of photosites. Although, as shown in FIG. 3b, only 240 pixels represent the active video information of a line of video information, each line is in reality 256 pixel periods in length with 16 pixel periods representing a black level reference signal of six pixel periods and a white level reference signal of 10 pixel periods.

As shown in FIG. 3a, each channel of information includes the video information of every 16th line of image sensor 18. Thus, the first video information channel includes lines 1, 17, 33, 49, 65, 81, 97, 113, 129, 145, 161, and 177, and the last video information channel includes lines 16, 32, 48, 64, 80, 96, 112, 128, 144, 160, 176, and 192.

Referring again to FIG. 1, the sixteen lines of signals from each of imagers 12 and 12' are processed in imager interface circuit 29 in accordance with image format signals received from system control unit (SCU) 31. As will be described in more detail below, interface circuit 29 selectively processes the block signals from imagers 12 and 12' to produce an output of 16 lines of video signals. Each of the 16 line signals that constitutes the analog video signal from circuit 29 is frequency modulated in an FM modulator circuit 30 on a carrier.

The frequency modulated video signals undergo a divide-by-N process in a divide-by-N circuit 32. A suitable divide-by-N circuit which may be adapted to the apparatus shown in FIG. 1 is illustrated in FIG. 7 of commonly-assigned U.S. Pat. No. 4,496,995 issued Jan. 29, 1985, by J. H. Colles et al. The value of "N" is equal (to the nearest integer) to the maximum selectable speed reduction divided by the selected speed reduction. The relationship between "N" and various values of the speed reduction "R" is given in columns 5 and 6 of FIG. 5. It will be noted that the selected speed reduction has been used to determine both the frame rate at which sensor 18 is read out and the value of "N" in the divide-by-N circuit 32. While it may not be apparent how these two parameters (frame rate and "N") relate to slow motion replay, the discussion which follows will show that the selection of these two parameters as described above in conjunction with the proper selection of a third parameter (recording tape speed) will produce the desired speed reduction of scene information upon playback.

A timing signal from timing circuit 20 is also applied to circuit 32 to be divided by the same factor "N" as the FM video signals.

The output of the divide-by-N circuit 32 is comprised of seventeen frequency divided frequency modulated signals. These signals are applied to a recording head driver circuit 34 that drives an 18 channel magnetic recording head 36. Channel 18 of the recording head is used for recording digital data. The digital data is produced by a data source 38 which produces digital data signals which are processed by data record processing circuit 40. Source 38 also provides data clock signals which are in synchronism with the digital data signals to data recording processing circuit 40. The processed data signal is supplied to recording head driver 34 and then to the magnetic recording head for track 18 in multihead 36.

The 18 signals are recorded along 18 separate channels or tracks on magnetic tape 38. Magnetic tape 38 is provided in a cassette (not shown) having supply reel 40, takeup reel 42, and tape guides 44 and 46. When the cartridge is inserted into apparatus 10, tape 38 is pressed against recording head 36 and reproducing head 48 as well as external guides 50, 52, and 54. Tape is advanced from reel 40 to reel 42 by means of capstans 56 and 58 respectively driven by capstan motors 60 and 62, controlled by motor drive 64.

The speed at which magnetic tape 38 is advanced during recording is selected to be proportional to the selected speed reduction and frame rate of recording. The relationship of the record frame rate, record tape speed and speed reduction is tabulated in columns 1, 2, and 6, respectively of FIG. 5. For example, if a record frame rate of 250 frames per second (Column 1) is chosen with a speed reduction R of 8 (column 6), then the magnetic tape 38 would be advanced at a speed of 62½ inches per second (Column 2).

Figure 4:
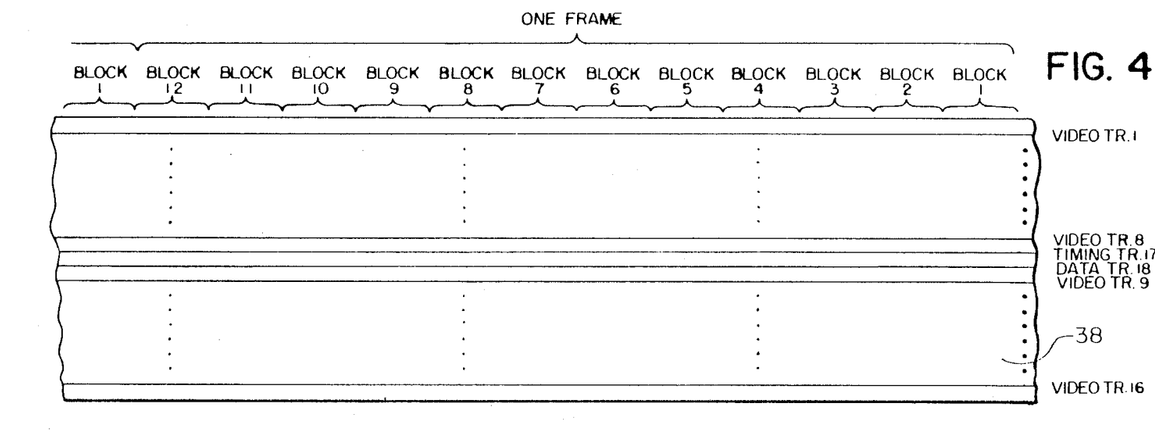
FIG. 4 shows the multitrack format of video information and digital data recorded longitudinally on magnetic tape.

Upon recording, the signals retain the block format (as shown in FIG. 4) in which a timing track 17 and a data track 18 are located between video tracks 1–8 and video tracks 9–16.

Having recorded information on magnetic tape 38 that corresponds to a scene including an object under study, a slow motion video display of such object is produced by playing back the recorded information at a constant tape speed of say, 7½ inches per second irrespective of the originally selected recording tape speed. As a result, the ratio of the recording tape speed to the playback tape speed yields a tape speed reduction ratio that equals the selected speed reduction. Further, all reproduced signals have the same black to white level frequency spread, thereby enabling a fixed frequency demodulator to be used irrespective of the selected speed reduction. To understand why the above-described selection of recording frame rate, the factor "N", recording tape speed and playback tape speed results in the desired speed reduction and signal form upon playback, reference is made to FIG. 5. It is apparent from inspection of FIG. 5 that "N" is equal to the maximum selected camera (record) frame rate divided by the selected camera frame rate. The effect of the divide-by-N circuit 32 is to reduce the black level to white level frequency spread by a factor "N". But because the ratio of record tape speed to playback tape speed varies in inverse proportion to "N", all signals produced upon playback have the same black level to white level frequency spread. Further, because the playback tape speed is always 7½ inches per second, all video information is reproduced at a frame rate of 30 frames per second, thereby resulting in the desired speed reduction.

Referring again to FIG. 1, the sixteen video signals produced by playback head 48 undergo signal processing in a preamplification and equalization circuit 64. The processed signals are then demodulated in an FM demodulator 66. After demodulation, the video signals (which are still in the block format shown in FIG. 3a) are converted to a line sequential video signal by a video processing circuit 68 (see FIG. 7).

A timing signal reproduced from timing track 17 is processed by circuit 64 and is applied to timing signal processing circuit 70 which extracts suitable timing and sync signals which are used in video processing circuit 68 to produce a signal to be displayed on monitor 72. The displayed scene information consists of a slow motion replay of the originally recorded scene at the selected speed reduction.

Data from data track 18 is reproduced by reproducing head 48 and preamplified and equalized in circuit 64. The data signal is then processed by data playback processing circuit 74 to be shown in window areas such as 76, 78 in a data frame 80 surrounding the main image area 82 of monitor 72.

Figure 6:
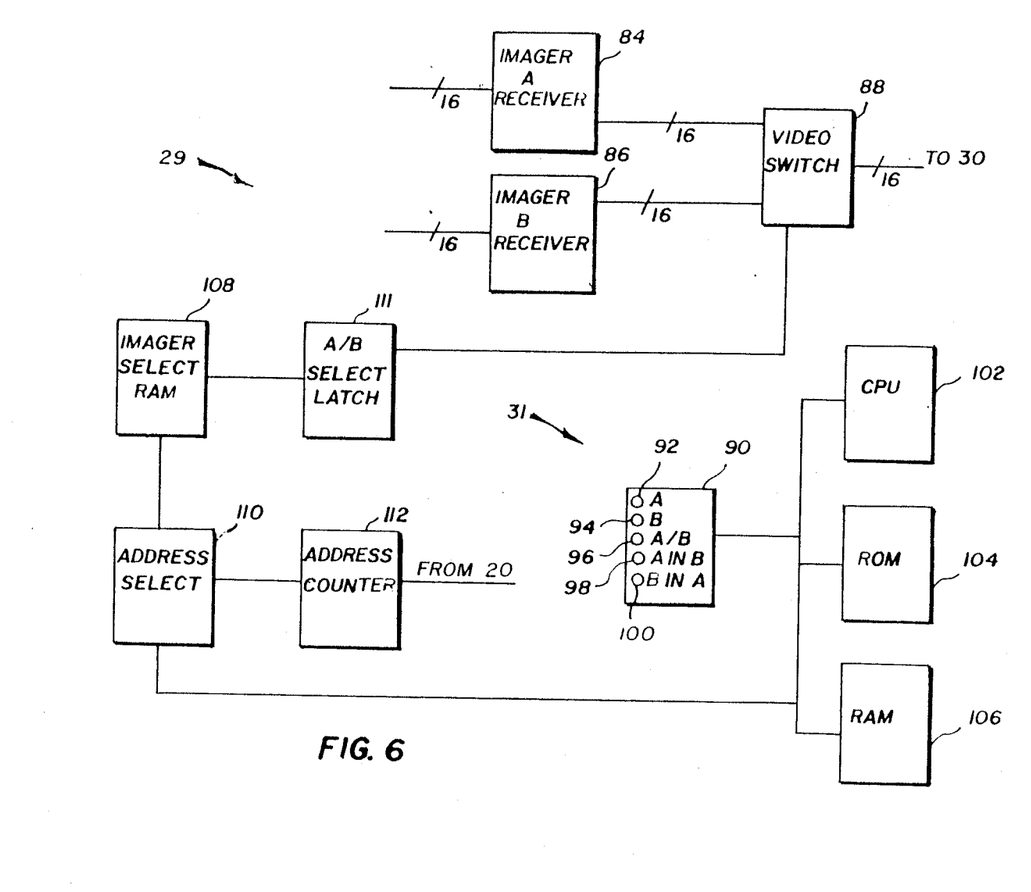
FIG. 6 is a block schematic diagram of the imager interface circuit and system control unit circuit of the analyzer of FIG. 1.

Referring now to FIGS. 6–10, there will be described a preferred embodiment of the image interleave technique of the present invention. As shown in FIG. 6, the 16 lines of video information from imagers A(12) and B(12') are received simultaneously by imager receivers 84 and 86 respectively when both imagers A (12) and B (12') are imaging a scene 16 at the same frame rate. Receivers 84 and 86 supply the 32 lines of video information from imagers A (12) and B (12') to video switch 88 which is controlled to selectively pass one of the inputs A or B on each of 16 video lines to a 16 line video output which is applied to FM modulator 30. Switching control of video switch 88 is effected in accordance with the mode of recording selected by an operator. According to the present invention, the motion analysis system described is operable to record all of the frames of imager A (12), all of the frames of imager B (12'), interleaving of the frames of imager A (12) with the frames of imager B (12'), overlay of the frames from imager A on the frames from imager B, and overlay of the frames from imager B (12') on the frames from imager A (12).

To assist in selecting the desired mode of operation of the motion analyzer, system control unit 31 is illustratively shown as including a control unit 90 having manually operable switches 92, 94, 96, 98 and 100 to effect the desired image recording mode. If switch 92 is actuated, all of the frames from imager A (12) are recorded at the selected frame rate on magnetic tape 38. If switch 94 is actuated, all of the frames from imager B (12') are recorded at the selected frame rate. If switch 96 is actuated according to the present invention, the frames from imager A (12) are interleaved with the frames from imager B (12') at the recorded frame rate. Thus, every other frame from imager A (12) and every other frame from imager B (12') are recorded, effectively cutting the frame rate for each imager to half the selected frame rate. However, the exposure speed of each frame that is recorded is at the frame rate speed. Thus, for example if each imager is operated at 1,000 frames per second, each frame has an exposure of 1/1000 sec. In the interleave mode, only 500 frames from each imager will be recorded at the 1,000 frames per second frame rate, but each frame that is recorded will be imaged at 1/1000 sec. exposure.

Switch 98 is actuated when a frame from imager A (12) is to be overlayed on a frame from imager B (12'). Actuation of switch 100 causes a frame from imager B (12') to be overlayed on a frame from imager A (12).

SCU 31 includes a central processing unit (CPU) 102, read only memory (ROM) 104, and random access memory (RAM) 106. CPU 102 may for example, be a microprocessor which is operated in conjunction with ROM 104 and RAM 106 to receive and transmit data and instructions to operate the various instrumentalities of the motion analyzer. The operation and programming of a microprocessor is well known to those skilled in the art, and is, for example, explained in the Harvard textbook, "The Art of Electronics", by Horowitz and Hill, Cambridge University Press, Cambridge, 1980, Chapter 11, entitled "Microprocessors", p. 484 and following. SCU 31 in accordance with the image mode selected loads information into imager select RAM 108 by means of address select circuit 110. This information defines the content of each recorded frame of video information on magnetic tape 38. Information is read out of imager select RAM 108 by address counter 112 through address select circuit 110 that advances column by column through blocks of video information in a frame. The output of RAM 108 is applied to A/B select latch 111 which supplies 16 select signals to video switch 88 to select which of the video signals from imager A (12) or imager B (12') is to be outputted for each of the 16 channels to FM modulator 30. If the imager A mode is selected then the data signals from select latch 110 actuate video switch 88 so as to cause all 16 channels of video information from imager A (12) to be outputted to modulator 30. If imager B output is selected, then the data signals from select latch 110 causes video switch 88 to output all 16 channels of video information from imager B to FM modulator 30.

If the interleave mode is selected, then the gating signals applied to video switch 88 from A/B select latch 110 gates through all 16 channels from imager A (12) for one frame of video and all 16 channels from imager B (12') for the next frame. This process is repeated so that alternate frames of imager A (12) and imager B (12') are recorded on tape 38. This is illustrated more clearly in FIG. 8 wherein 3 frames of video information are shown recorded on tape. Frame 1 includes blocks 1-12 of 16 lines of video information from imager A (12), frame 2 includes blocks 1-12 each of 16 lines of video information from imager B (12'), and frame 3 includes blocks 1-12 of 16 lines each of video information from imager A (12), etc.

Figure 9A:
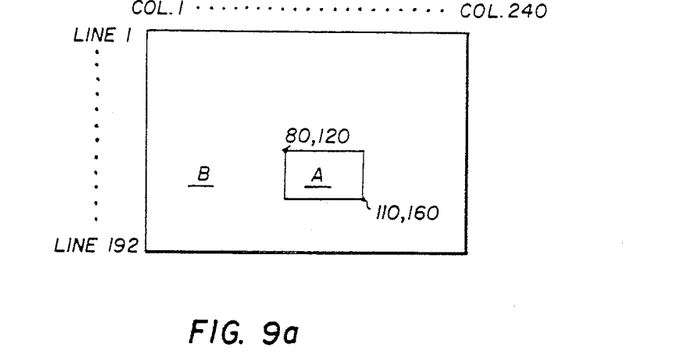
FIGS. 9a and 9b are a diagram and table respectively illustrating the overlay on a video monitor of video frames from two imagers.
Figure 9B:
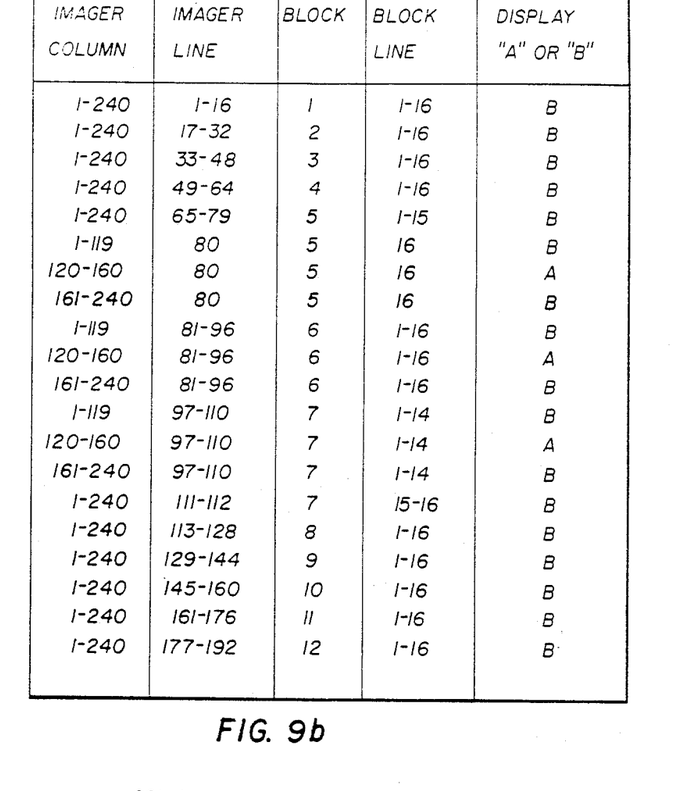

In either of the overlay modes, the size of the overlay region will determine the pattern of video information from imagers A (12) and B (12') to be recorded. As an example, reference is made to FIGS. 9a and 9b in conjunction with the imager shown in FIG. 2. As shown in FIGS. 9a and 9b, an image from imager A (12) is overlayed on an image from imager B (12'). The area of image A includes the pixels in lines 80-110 from columns 120-160. The boundaries of the image to be overlayed is entered into SCU 31 by suitable control (not shown). SCU 31 will then load the address information in imager select RAM 108 to produce the 16 gate select signals to control video switch 88. For example, in the example of FIGS. 9a and 9b, columns of video information are read out block by block from imagers A (12) and B (12'), gate select signals will be applied to video switch 88 to pass through the video information from one of the images according to the table shown in FIG. 9b. For example, as block 6 is read out column by column, for columns 1-119, switch 88 will be actuated to pass through video information from imager B (12') on all 16 lines; for columns 120-160, information from imager A (12) on all 16 lines; and for columns 161-240, video information from imager B (12') on all 16 lines.

Figure 7:
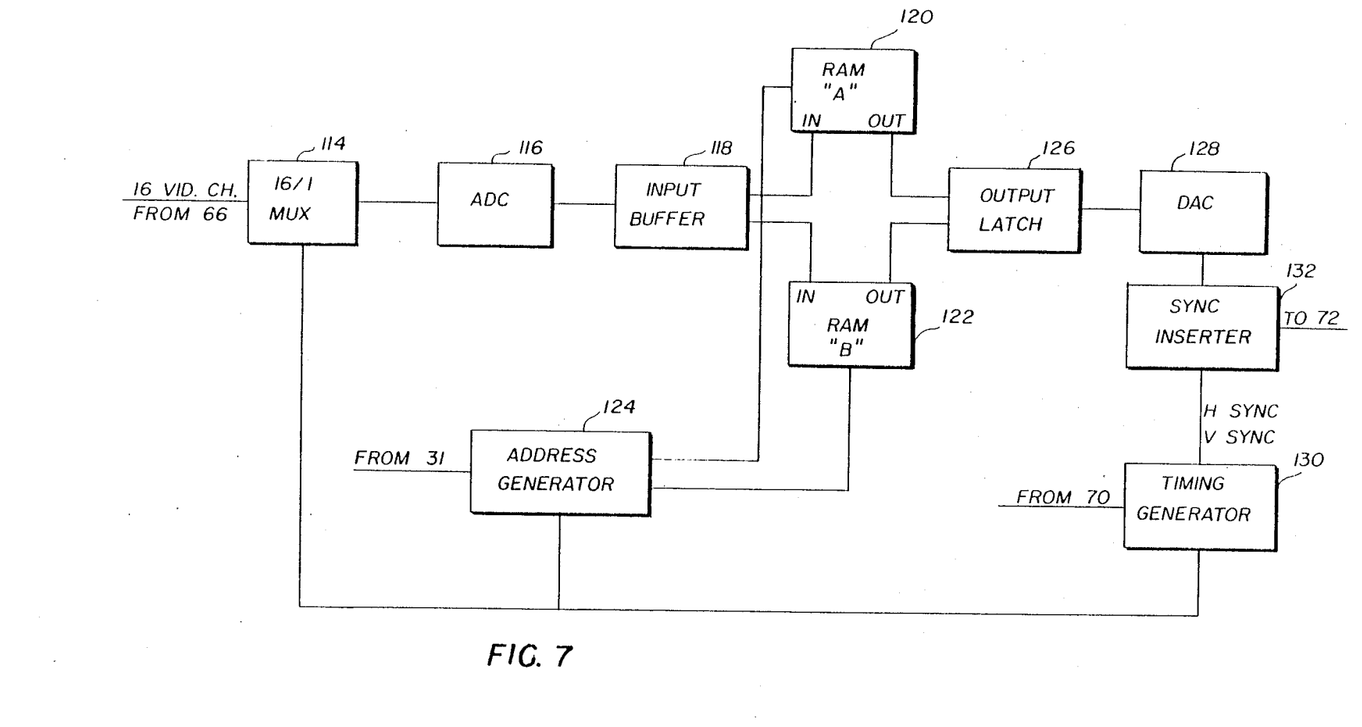
FIGS. 7 is a block schematic diagram of the video processing circuit of the analyzer of FIG. 1.
Figure 8:
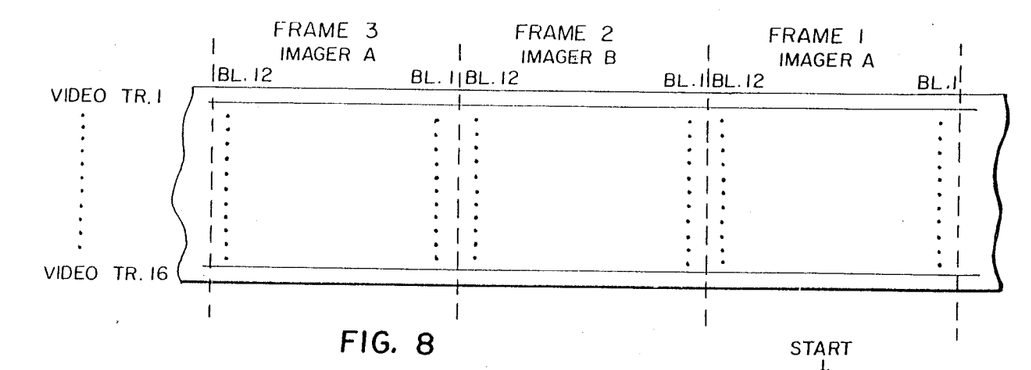
FIG. 8 is a diagram illustrating interleaving of frames of video information from two imagers recorded in block format on magnetic tape.

Referring now to FIG. 7, there will be described in greater detail video processing circuit 68 of FIG. 1. As described above, FM demodulator 66 produces 16 simultaneous channels or lines of video information which are supplied to video processing circuit 68. In order to display this video information on a standard video monitor, the simultaneous lines of video information must be converted into line sequential information. According to the present invention, if frames of video information from two imagers have been recorded in an interleave mode on magnetic tape 38, upon playback of the tape, either all of the imager A frames may be displayed or all of the imager B frames may be displayed, or the imager A frames and imager B frames may be displayed in an interleaved fashion. To effect these playback modes, video processing circuit 68 includes a 16:1 multiplexer (MUX) 114, analog to digital converter (ADC) 116, input buffer 118, random access memories (RAM) 120 and 122, address generator 124, output latch 126, digital to analog converter (DAC) 128, timing generator 130 and sync inserter circuit 132. Multiplexer 114 is controlled by a timing signal which is 16 times as fast as the signal rate of the 16 lines of video information derived from demodulator 66. Multiplexer 114 thus sequentially passes through the video information appearing on each of the 16 video input channels to the output line at a rate which is 16 times faster than the input rate. The multiplexer 114 thus samples all 16 input video lines before the pixel information corresponding to column 2 of a block appears on the input lines.

The output signal from multiplexer 114 is applied to ADC 116 which converts the analog pixel signal to a digital pixel signal which is loaded into input buffer 118. Address generator 124 generates address signals for storing the digital information in input buffer 118 in either "A" RAM 120 or "B" RAM 122. Address generator 124 receives signals from SCU 31 to generate sequential addresses for storing the digital information either in RAM 120 or RAM 122, depending upon whether the frame of video information to be stored has been generated by imager A or imager B.

If the operator has selected interleave playback mode, then as a frame from imager A is written into RAM 120, a frame from imager B is read out of RAM 122. During the next frame period, a frame of video information from imager B is written into RAM 122 and a frame of video information from imager A is read out from RAM 120. It will be appreciated that, whereas the pixels of video information written into either RAM 120 or RAM 122 is sequenced so that column 1 of lines 1-16 is followed by column 2 of lines 1-16 and so on to column 240 of lines 1-16, the pixels of video information are read out of RAMs 120, 122 in line sequential format so that, for example, line 1, columns 1-240 are read out first, then line 2, columns 1-240, etc.

Figure 10:
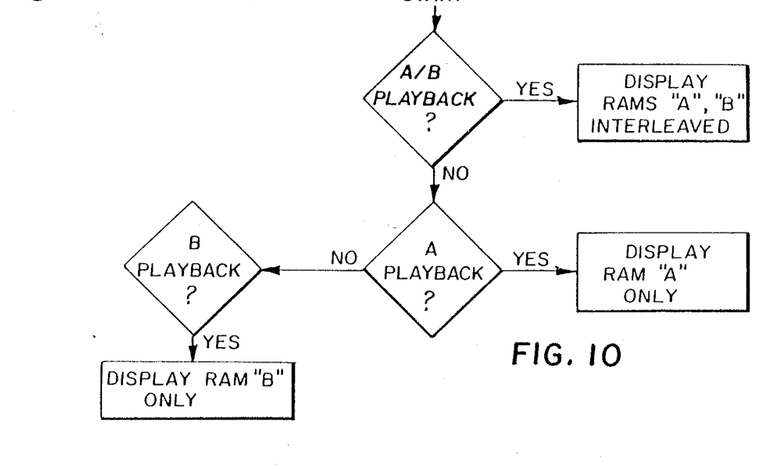
FIG. 10 is a flow chart for operating the analyzer of FIG. 1 in selected playback modes.

The digital data read out of RAM 120 and RAM 122 is loaded into output latch 126 and converted into an analog video signal by DAC 128. Timing generator 130 produces H sync and V sync signals which are combined in sync inserter 132 with the analog video information from DAC 128 to produce line sequential video to be displayed on monitor 72. If a playback mode is selected in which either all of the frames of imager A or all of the frames of imager B are played back on monitor 72, then the address signals produced by address generator 124 will cause only frames from either RAM 120 or RAM 122 to be played back. FIG. 10 illustrates a program for controlling playback in accordance with the playback mode selected by an operator.

The invention has been described in detail with particular reference to preferred embodiments thereof, but it will be understood that variations and modifications can be effected within the spirit and scope of the invention. Imagers A and B may be read out with different numbers of video lines per block. For example, in the pixel format described above, imagers A and B could be read out in blocks of 6 with 32 video channels per block. In such case, the various timing signals will be adjusted according to the pixel matrix size of the imagers, and according to the block format and frame rate chosen.

What is claimed is:

1. A motion analysis system comprising:
   a first motion video imager;
   a second motion video imager;
   means for continuously reading out each of said video imagers simultaneously at the same frame rate of F frames per second, where F is selectively variable, in a block format in which a frame of video information comprises a sequence of blocks of parallel lines of video information which have been read out simultaneously; and
   means for recording every other frame from each of said first and second imagers in interleaved fashion on the same magnetic tape, each of said frames on magnetic tape being recorded in a plurality of parallel recording tracks in a sequence of blocks of parallel lines of video information.

2. The system of claim 1 including selectively controllable means for playing back on a video monitor frames of video information from said magnetic tape (1) in a first mode, wherein only frames from said first imager are played back; (2) in a second mode, wherein frames from said second imager are played back; and (3) in a third mode, wherein frames from said first and second imagers are played back in interleaved fashion.

3. The system of claim 1 including imager interface circuit means for receiving video information simultaneously from said first and second video imagers and for selectively providing to said recording means for recording on said magnetic tape, one of the following sequence of frames (1) all of the frames from said first imager; (2) all of the frames from said second imager; (3) every other frame from each of said first and second imagers in interleaved fashion; (4) overlay of the frames from said first imager on the frames from said second imager; or (5) overlay of the frames from said second imager on the frames from the first imager.

* * * * *